United States Patent [19]
Padgett

[11] Patent Number: 5,964,299
[45] Date of Patent: Oct. 12, 1999

[54] HAND HELD EDGING TOOL

[76] Inventor: Edwin Padgett, 3453 Edwards Rd., Lady Lake, Fla. 32159

[21] Appl. No.: 08/891,253

[22] Filed: Jul. 10, 1997

[51] Int. Cl.$^6$ ........................................................ A01B 1/12
[52] U.S. Cl. ............................ 172/378; 172/13; 172/380; 30/315
[58] Field of Search ............................... 172/13, 14, 371, 172/378, 375, 380, 379; 7/114, 116; 30/329, 315, 314; 294/49, 51, 52, 55.5

[56] References Cited

U.S. PATENT DOCUMENTS

| | | | |
|---|---|---|---|
| 1,000,473 | 8/1911 | Wilson | 172/378 |
| 1,204,323 | 11/1916 | Sohn | 172/378 |
| 4,334,583 | 6/1982 | Parker | 172/375 |
| 4,411,320 | 10/1983 | Hass | 172/13 |

Primary Examiner—Robert E. Pezzuto
Attorney, Agent, or Firm—Oltman, Flynn & Kubler

[57] ABSTRACT

A hand held grass edging tool includes a substantially flat blade having a top edge, an opposite generally inwardly disposed, v-shaped bottom edge and a pair of opposite side edges extending therebetween, each of the side edges including a generally inwardly disposed, v-shaped portion recessed substantially horizontally into the blade to open laterally out of the blade and having an upper side edge segment with an upper side edge segment lower end and extending upwardly and outwardly for moving strands of grass against the ground and bearing against and severing the strands of grass as the blade advances into the ground, and having a lower side edge segment intersecting the upper side edge segment lower end and extending downwardly and outwardly from the upper side edge segment lower end; the bottom edge and the v-shaped portion of the side edges including a beveled cutting edge; and a handle having a lower end secured to the top edge of the blade and an opposite top gripping portion.

1 Claim, 1 Drawing Sheet

U.S. Patent  Oct. 12, 1999  5,964,299
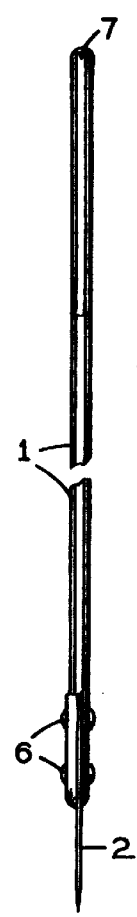
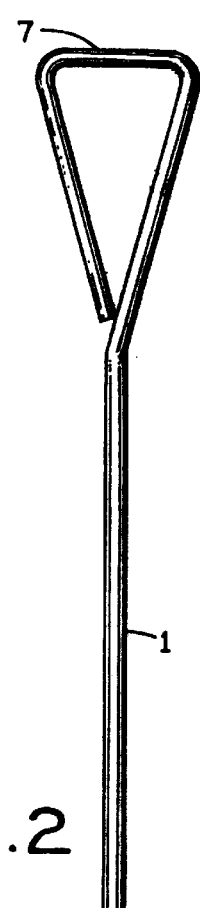
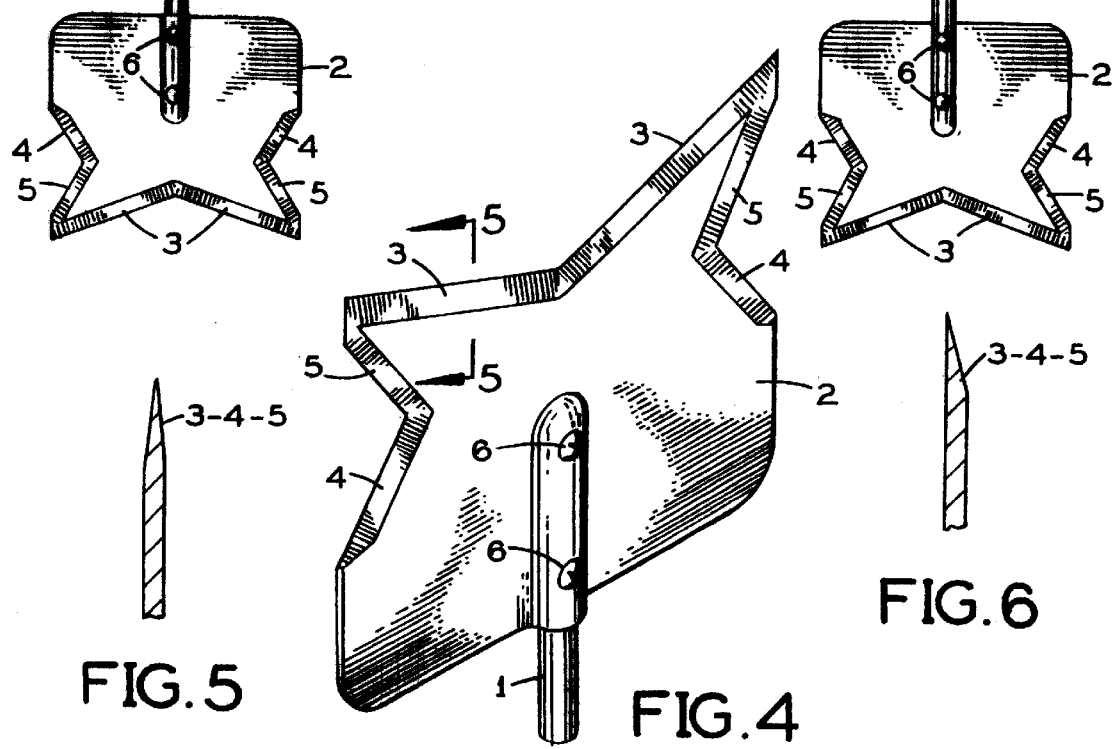

HAND HELD EDGING TOOL

FIELD OF THE INVENTION

The present invention relates, to a Grass Edger.

BACKGROUND OF THE INVENTION

It is possible to edge grass around sidewalks and driveways using square edgers and round shaped edgers. Both are hard to push in the soil to cut the grass. The square edger takes much force to cut the grass because it uses the entire cutting edge at one time. The round edger has it tendency to go either direction.

SUMMARY OF THE INVENTION

It is the object of the present invention to provide a edger for edging around driveways, sidewalks etc.

Another object of the present invention is to edge with less effort.

Another object of the present invention is to make a clean cut.

The basic design of the tool is the "V" shape of the cutting edge. When pushed in the ground it cuts a small portion of the cutting edge at a time requiring little thrust. The sides of the tool are "V" shaped and sharpened. If grass runners are not cut on the downward thrust the runner will be cut on the extraction of the tool without hanging up on the edging tool. This tool can also be used as a chopping tool to remove excess grass that has been cut loose from the driveway, sidewalk, etc.

BRIEF DESCRIPTION OF THE DRAWINGS

FIG. 1 is a left side elevation view of the edging tool.

FIG. 2 is a right side elevation view of the edging tool.

FIG. 3 is a view showing the thinness of the edging blade.

FIG. 4 is an enlarged view of the edging tool showing the attachment to the handle with 2 rivets.

FIG. 5 is a cross section of the cutting edge.

FIG. 6 is a cross section of the cutting a edge.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Referring first to FIGS. 1 and 2 the edging tool has a handle 1. A blade 2 attached to handle 1 by two rivets 6. When pushing on handle 1, which is attached to blade 2, the cutting edge 3 is pushed through the grass and into the ground cutting the grass from the sidewalk, driveway, etc. As the blade 2 is pushed in the ground, edges 4 on the sides, cuts any grass runners that might have slipped by cutting edge 3 on the downward thrust. Once the blade 2 has been pushed in the ground below cutting edge 4 the top gripping portion 7 of the handle 1 is used to pull the blade out of the grass and soil. As the blade 2 1s retracted from the grass and soil the cutting edge 5 will cut any loose runners that might have slipped by on the downward thrust, thus avoiding any hangups once the cycle is complete the procedure is repeated again and again until the edging is complete, when the line has been cut with blade 2 around walkways, etc. The handle 1 is used to chop with blade 2 using edges 4 and 5 to cut and remove grass that has been cut from the main body of grass, thus giving a clean cut around walkways, etc.

FIG. 3 shows the sideview of the tool used for chopping out grass that has been cut loose from the main, body of grass.

FIG. 4 shows the "V" cutting edges 3, 4 and 5. The cutting edges 3, 4 and 5 engages a small surface area at a time causing less friction and makes blade 2 easy to penetrate the grass and soil. The cutting edge 3, 4, and 5 cut from the outside of the cutting edge 3, 4, and 5 to the center of the cutting edge 3, 4, and 5 allowing no grass runners to escape. once the runners are on the cutting edge of 3, 4, and 5 the runners are pushed toward the center of the cutting edge 3, 4, and 5 flaking a clean and easy cut.

FIG. 4 also shows blade 2 shaped to fit the handle 1 with 2 rivets 6. Thus eliminating any movement of the blade 2 on handle 1.

FIG. 5 shows the cutting edges 3, 4 and 5 to be sharpened on both sides.

FIG. 6 shows the cutting edges 3, 4 and 5 to be sharpened on 1 side only.

I claim:

1. A hand held grass edging tool comprising:
    a substantially flat blade having a top edge, an opposite generally inwardly disposed, v-shaped bottom edge and a pair of opposite side edges extending therebetween, each of said side edges including a generally inwardly disposed, v-shaped portion recessed substantially horizontally into said blade to open laterally out of said blade and having an upper side edge segment with an upper side edge segment lower end and extending upwardly and outwardly for moving strands of grass against the ground and bearing against and severing the strands of grass as said blade advances into the ground, and having a lower side edge segment intersecting said upper side edge segment lower end and extending downwardly and outwardly from said upper side edge segment lower end;
    said bottom edge and said v-shaped portion of said side edges including a beveled cutting edge; and
    a handle having a lower end secured to said top edge of said blade and an opposite top gripping portion.

* * * * *